No. 683,136. Patented Sept. 24, 1901.
I. M. MURPHY.
CHURN.
(Application filed Dec. 22, 1900.)
(No Model.) 3 Sheets—Sheet 1.
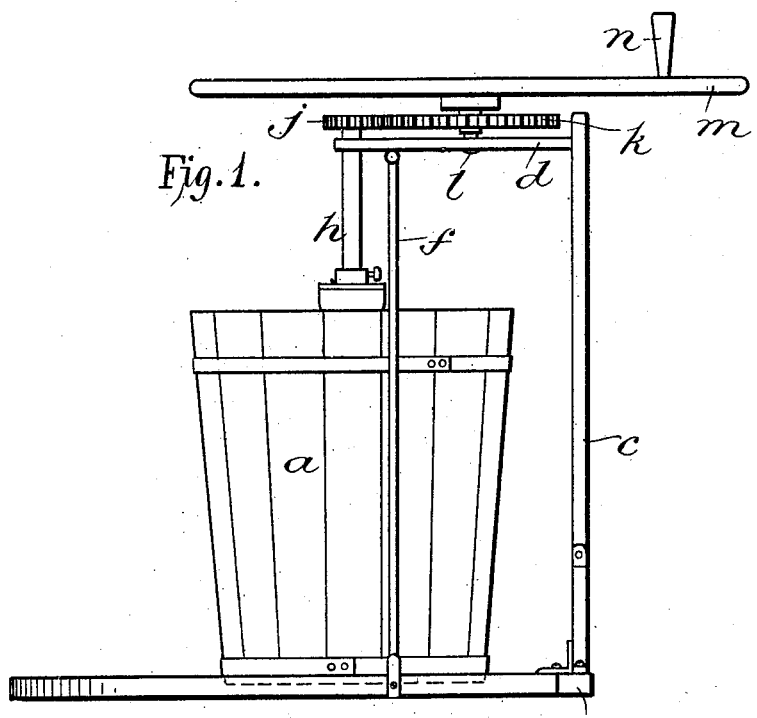
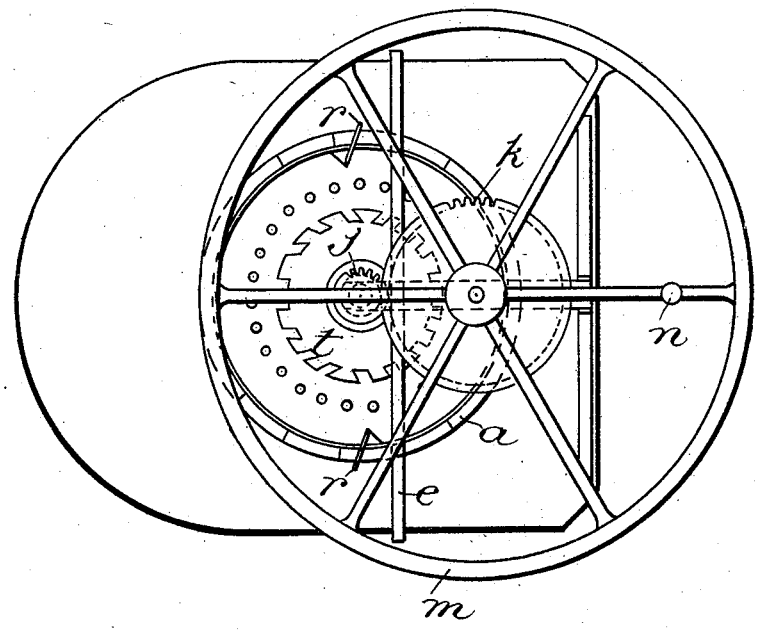

No. 683,136. Patented Sept. 24, 1901.
I. M. MURPHY.
CHURN.
(Application filed Dec. 22, 1900.)
(No Model.) 3 Sheets—Sheet 2.
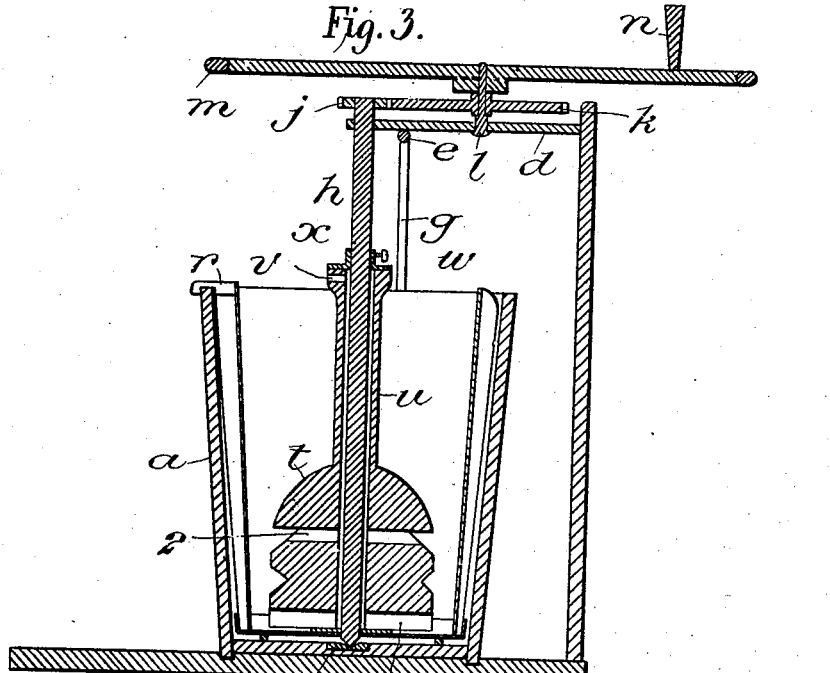
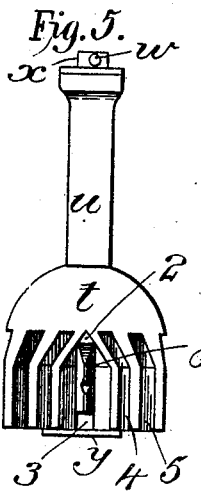
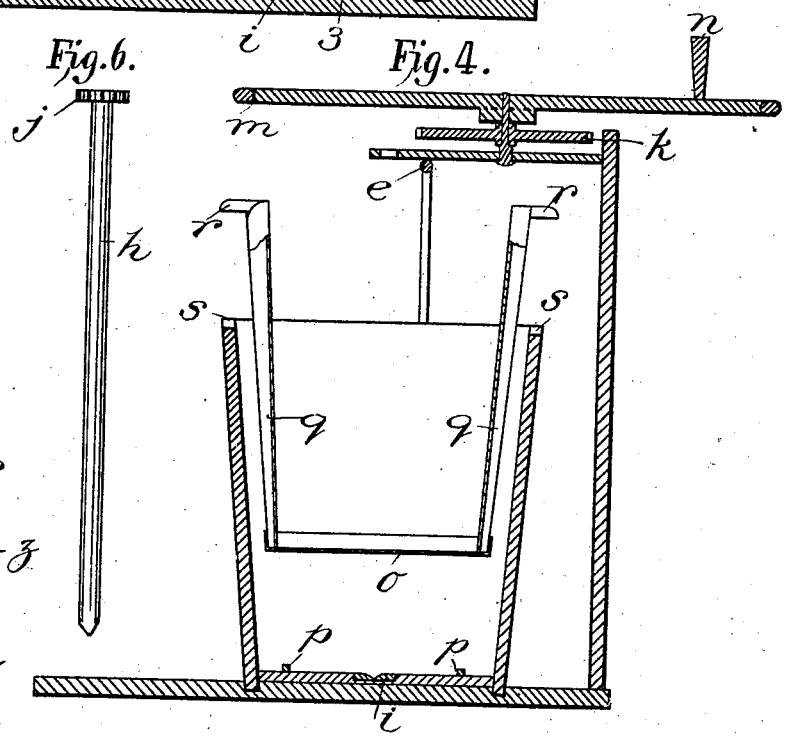
Witnesses
Edgworth Thieme
Henry Thieme.
Inventor
Ida M. Murphy
By her Attorneys
Bennet Seward No. 683,136. Patented Sept. 24, 1901.
I. M. MURPHY.
CHURN.
(Application filed Dec. 22, 1900.)
(No Model.) 3 Sheets—Sheet 3.

Witnesses:
George Barry Jr
Henry Thieme.

Inventor:
Ida M. Murphy
by attorneys
Brown & Seward

THE NORRIS PETERS CO., PHOTO-LITHO., WASHINGTON, D. C.

UNITED STATES PATENT OFFICE.

IDA M. MURPHY, OF NEW YORK, N. Y.

CHURN.

SPECIFICATION forming part of Letters Patent No. 683,136, dated September 24, 1901.

Application filed December 22, 1900. Serial No. 40,728. (No model.)

*To all whom it may concern:*

Be it known that I, IDA M. MURPHY, a citizen of the United States, and a resident of the borough of Manhattan, in the city and State of New York, have invented a new and useful Improvement in Churns, of which the following is a specification.

My invention relates to an improvement in churns, with the objects in view of providing a very simple and efficient mechanism whereby butter may be produced very rapidly, the said mechanism being so arranged that the dasher and its shaft may be quickly removed from the tub when so desired and in which the abutments against which the cream is dashed are removably secured to the tub and carry the strainer by means of which the butter may be removed from the tub and the buttermilk drained therefrom.

A further object is to provide a dasher of improved construction, the said dasher being so formed that it will both agitate and aerate the milk or cream when the dasher is rotated, the said dasher being provided with tapered wings having air-ducts in proximity to their bases leading from the dasher-bore, so that as the tapered wings throw the milk or cream outwardly toward the abutments of the churn the air will be drawn outwardly also.

A further object is to provide a dasher of the above construction in which square-faced beaters are provided, of irregular form, between the wings for rapidly parting small portions of the milk or cream as it returns from the abutments, thus insuring a very complete agitation thereof.

A practical embodiment of my invention is represented in the accompanying drawings, in which—

Figure 7:
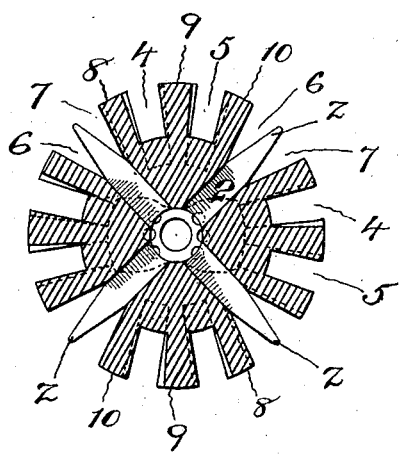
Figure 8:
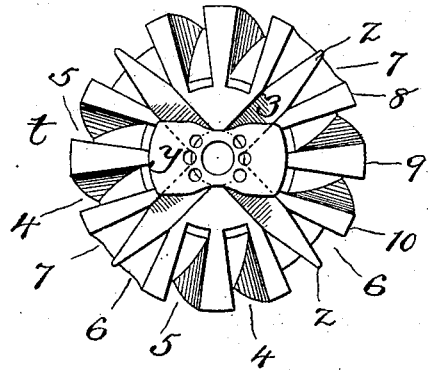

Figure 1 represents the churn in side elevation. Fig. 2 represents the same in top plan. Fig. 3 represents the churn in vertical central section. Fig. 4 is a similar view with the dasher and its shaft removed and the strainer with its abutments partially removed from the tub. Fig. 5 is a view in side elevation of the dasher. Fig. 6 is a view in side elevation of the dasher-shaft. Fig. 7 is an enlarged cross-section through the dasher-head, and Fig. 8 is an enlarged inverted plan view of the dasher-head.

The tub is denoted by $a$, and it may be made of any desired size to suit different requirements. The base upon which the tub is seated is denoted by $b$. A vertical upright $c$ is rigidly secured to the base $b$, and it is provided with a forwardly-extended arm $d$ at a point a considerable distance above the top of the tub $a$. The outer ends of the arm $d$ are supported upon a cross-bar $e$, connecting the upper ends of two vertical uprights $f$ $g$, the lower ends of which are secured to the base $b$. A rotary dasher-shaft $h$ is mounted at its upper end in the arm $d$, and its lower end rests in a step or bearing $i$ in the bottom of the tub $a$. This dasher-shaft $h$ is provided with a small gear $j$, which meshes with a large gear $k$, mounted on a vertical pivot or stud axle $l$, uprising from the arm $d$. The large gear $k$ is fixed to rotate with a hand-wheel $m$, provided with a suitable operating-handle $n$.

A strainer $o$ is fitted to normally rest in close proximity to the bottom of the tub $a$ upon suitable spacing pins or projections $p$. A plurality of abutments $q$ are secured at their lower ends to the strainer $o$ and are provided at their upper ends with outwardly-extended handles $r$, which are fitted to enter sockets $s$ in the top of the tub $a$. In the present instance I have shown two of these abutments $q$ arranged diametrically opposite each other. These abutments may be used for removing the strainer $o$ after the butter has been made, the strainer permitting the buttermilk to drain therefrom as the strainer is being removed.

My improved dasher comprises a head $t$ and a tubular portion or shank $u$, uprising therefrom. The bore of the dasher is slightly larger than the shaft $h$, which it is intended to surround, and air may thus be admitted from the exterior to the space between the walls of the bore and the shaft—in the present instance through a hole $v$ at the top of the dasher-shank. The dasher is provided with a collar $w$ on the top of its tubular extension or shank $u$, which collar is provided with a thumb-screw $x$ for clamping the dasher to the shaft $h$. The bottom of the dasher-head $t$ is provided with a plate $y$, which has an opening therein of approximately the same diameter as the shaft $h$, so that the dasher is held centered upon the shaft, with the walls of its bore spaced from the shaft. The dasher-head is of cylindrical form in cross-section and is provided with a flat bottom and a rounded top. This head is provided with a plurality of tapered wings $z$, arranged vertically and formed by cutting V-shaped notches 6 7 in the periphery of the head. Air-ducts 2 lead from the bore of the dasher outwardly to the bases of the tapered wings $z$ at the tops of the wings, and similar air-ducts 3 lead from the bore of the dasher outwardly to the bases of the tapered wings at the bottoms of the wings. Abrupt-faced beaters 8, 9, and 10, of irregular form, are provided in the periphery of the dasher-head between the wings $z$. These beaters are formed by the V-shaped notches 6 7 and square notches 4 5, the said notches extending vertically a short distance upwardly from the bottom of the head and then at an angle to their point of termination at the rounded top of the head. In the accompanying drawings I have shown four of these tapered wings $z$ and three abrupt-faced abutments between each two successive wings; but it is to be understood that I may vary the number of wings and abutments to suit different requirements.

The operation of my device is as follows: The strainer, together with its abutments, is placed in position within the tub. The dasher may then be placed in position, and finally the shaft is inserted through the dasher and engaged with its bearings. The set-screw $x$ in the collar $w$ may then be caused to engage the shaft for locking the dasher thereto in any desired position above the bottom of the tub. As the dasher is rotated the milk or cream within the tub will not only be thoroughly agitated, but will be thoroughly aerated because of a downward suction through the bore of the dasher. The aeration will be enhanced because of the outward throw of the milk or cream from the inclined faces of the tapered wings causing a tendency to produce a vacuum at their bases at the points where the air-induction passages are located, thereby drawing the air rapidly through these passages and well into the body of the milk or cream. As the milk or cream returns from the wall of the churn intermediate of the inclined faced wings it will be cut sharply and thoroughly beaten by the abrupt faces of the intermediate beaters, and this cutting and beating will take place after the air has been thoroughly mixed with the body of milk or cream, the result being that the separation of the butter will take place in an unusually short space of time and will be thorough and accomplished with comparatively little expenditure of power. After the butter has been made the shaft $h$, with its dasher, is removed. The strainer, with the butter thereon, may then be lifted out of the tub by means of the abutments $q$, thus removing the butter from the tub and at the same time permitting the buttermilk to be drained therefrom.

It is evident that changes might be resorted to in the form and arrangement of the several parts without departing from the spirit and scope of my invention. Hence I do not wish to limit myself strictly to the structure herein set forth; but

What I claim is—

1. A churn comprising a tub, a dasher mounted to rotate within the tub and means for rotating the dasher, the said dasher being provided on its periphery with tapered wings and abrupt-faced beaters alternately arranged and air-ducts leading through the body of the dasher in proximity to the bases of the said tapered wings in communication with an air-passage leading to the external air, substantially as set forth.

2. In combination, a tub, a dasher mounted to rotate within the tub and means for rotating the dasher, the said dasher being provided, on its periphery, with tapered wings and abrupt-faced abutments alternately arranged and further provided with different horizontal series of air-ducts leading to the interior of the tub in proximity to the bases of the tapered wings in communication with an air-passage leading through the body of the dasher to the external air, substantially as set forth.

In testimony that I claim the foregoing as my invention I have signed my name, in presence of two witnesses, this 30th day of December, 1900.

IDA M. MURPHY.

Witnesses:
FREDK. HAYNES,
C. S. SUNDGREN.